(12) United States Patent
Tresenfeld et al.

(10) Patent No.: US 7,699,019 B2
(45) Date of Patent: Apr. 20, 2010

(54) RAMP SAFETY GUIDE

(76) Inventors: Eugene Lee Tresenfeld, 523 Antelope Way, Eugene, OR (US) 97401; Robert Dudley Reid, 88519 Periwinkle Rd., Springfield, OR (US) 97478

( * ) Notice: Subject to any disclaimer, the term of this patent is extended or adjusted under 35 U.S.C. 154(b) by 478 days.

(21) Appl. No.: 11/823,170

(22) Filed: Jun. 26, 2007

(65) Prior Publication Data

US 2009/0117297 A1    May 7, 2009

(51) Int. Cl.
    *B60P 1/43* (2006.01)
    *B60Q 1/30* (2006.01)

(52) U.S. Cl. ........................................ 116/28 R; 116/30

(58) Field of Classification Search .............. 116/28 R, 116/30, 63 P, 63 R; 33/264; 40/514, 590; 280/727
See application file for complete search history.

(56) References Cited

U.S. PATENT DOCUMENTS

| | | | | |
|---|---|---|---|---|
| 3,493,925 | A * | 2/1970 | Brancale | 340/932.2 |
| 3,834,036 | A * | 9/1974 | Scarritt, Sr. | 33/264 |
| 4,079,519 | A * | 3/1978 | Carmouche | 33/264 |
| 4,843,373 | A * | 6/1989 | Trickle et al. | 340/540 |
| 4,977,400 | A * | 12/1990 | Jeffries | 340/932.2 |
| 5,285,205 | A * | 2/1994 | White | 340/932.2 |
| 5,513,943 | A * | 5/1996 | Lugash et al. | 414/545 |
| 5,524,395 | A * | 6/1996 | Boiron | 52/64 |
| 5,825,305 | A * | 10/1998 | Biferno | 340/958 |
| 6,394,734 | B1 * | 5/2002 | Landoll et al. | 414/480 |
| 6,409,458 | B1 * | 6/2002 | Cohn et al. | 414/537 |
| 7,395,776 | B2 * | 7/2008 | Harruna | 116/28 R |
| 7,617,625 | B2 * | 11/2009 | Storm | 40/590 |
| 2007/0044359 | A1 * | 3/2007 | Worley | 40/590 |

FOREIGN PATENT DOCUMENTS

| | | | |
|---|---|---|---|
| DE | 10000131 | A1 * | 7/2001 |
| EP | 17620 | A1 * | 10/1980 |
| EP | 479652 | A1 * | 4/1992 |
| GB | 2291670 | A * | 1/1996 |
| JP | 2002362214 | A * | 12/2002 |
| WO | WO 2004094185 | A1 * | 11/2004 |
| WO | WO 2009002497 | A1 * | 12/2008 |

* cited by examiner

*Primary Examiner*—R. Alexander Smith
(74) *Attorney, Agent, or Firm*—Risto A. Rinne, Jr.

(57) ABSTRACT

An apparatus for safely locating an elevated-end of a ramp includes a center strip that hangs down from an overhead location proximate the elevated-end. The center strip aligns with a center of the ramp and is used as a visual or tactile aide to guide a person toward the elevated end. A variation includes a pair of lateral strips that are each disposed proximate the elevated-end and also proximate opposite outer edges of the ramp. Another variation includes the use of two parallel strips to more accurately indicate either the center of the ramp or one of its edges. Fixed, detachable, and retractable versions are described that are attached to either a ceiling of a truck or to an inside surface of an overhead door of the truck.

40 Claims, 5 Drawing Sheets

RAMP SAFETY GUIDE

BACKGROUND OF THE INVENTION

1. Field of the Invention

The present invention, in general, relates to safety devices and, more particularly, to a guide for improving ramp safety.

Ramps for loading trucks are well known devices. In particular, companies that specialize in moving furniture (i.e., house moving) use ramps to load furniture into the vehicle and to remove it from the vehicle.

Similarly, individuals who move their own furniture often rent a truck from a truck rental company and use the ramp that is furnished with the truck for loading and unloading of furniture.

Also, certain delivery companies, in particular those that contract out to retailers to deliver their furniture and other products to consumers, also use ramps for loading and unloading items to and from their trucks.

When various furniture items are carried for loading or unloading, either because of their bulk (size) or weight or both it is common for two people to work together, one person lifting each end. Usually, each person must face toward the object being carried in order to properly lift it.

Consequently, they often cannot see behind them where they are walking.

When loading items at ground level onto a ramp (i.e., an inclined plane) for loading into a truck it is fairly easy for the lead person who, quite likely, is walking backwards to discover the location of the ramp, step onto it, and then make the necessary ascension. If they initially miss the bottom of the ramp, then a step to either side along with a slight rise places them in the center of the ramp.

However, when carrying objects off of the truck they are elevated to start. A person stepping backwards who misses the ramp is apt to stumble at best and possibly even to fall off of the truck. The risk for great personal harm is apparent, compounded by the elevation. If the lead person misses the start of the ramp at ground level, he or she simply takes small steps to each side until the ramp is found and then, as mentioned above, they step onto the bottom portion of the ramp. However, stepping off of the truck and missing the ramp can result in a sudden and severe fall. If that were not bad enough, the object being carried is all the person falling has to grab hold of. There is a tendency for the person to grab as tightly as possible onto the object that is being carried. This can cause the object to be pried loose from the grip of anyone else who may be carrying an opposite end of the object. Consequently, the person falling can bring the object down on top of themselves as well. This can cause additional injury. Additionally, the object being carried is certain to fall regardless of whether it lands on the lead person or not. Therefore, the likelihood to damage the object being carried off of the truck is also substantial.

Even when cargo is being loaded by a sole operator, the cargo itself can obscure the location of the ramp, especially if it is somewhat bulky. The same risks and difficulties as mentioned above, will still occur. In similar ways, the risks during ascent are lessened and the risks during descent are substantial.

Also, it tends to be dark inside the truck which impairs visibility, especially when compared to that outside at the bottom of the ramp. In other words, it is harder to look down and see the start of the ramp in the truck. This is especially true on dark or rainy days and during dusk or dawn when lighting is even poorer.

Accordingly, there exists today a need for a ramp safety guide that helps to ameliorate the above-mentioned problems and difficulties as well as any additional problems and difficulties as may be recited in the "OBJECTS AND SUMMARY OF THE INVENTION".

Clearly, such an apparatus would be a useful and desirable device.

2. Description of Prior Art

Ramps for truck are, in general, known. While the structural arrangements of the known types of ramps may, at first appearance, have certain distant similarities with the present invention, they differ in substantial and material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a ramp safety guide that can improve safety when using a ramp.

It is also an important object of the invention to provide a ramp safety guide that can improve the speed of unloading cargo from a truck when using a ramp.

Another object of the invention is to provide a ramp safety guide that can prevent injury when unloading cargo from a vehicle and onto a ramp.

Still another object of the invention is to provide a ramp safety guide that can be used by one person to unload cargo down a ramp.

Still yet another object of the invention is to provide a ramp safety guide that can be used by two people who are carrying a cargo item to unload the cargo item down a ramp.

Yet another important object of the invention is to provide a ramp safety guide that can help to prevent damage to cargo that is being carried down a ramp.

Still yet another important object of the invention is to provide a ramp safety guide that includes a center strip that hangs down from an elevated location in a truck and which indicates the center of a ramp.

A first continuing object of the invention is to provide a ramp safety guide that includes a pair of strips that are laterally disposed on opposite sides of a center longitudinal axis of a ramp and which hang down from an elevated location in a truck and which each indicate a side of a ramp.

A second continuing object of the invention is to provide a ramp safety guide that includes a pair of strips that are disposed parallel to a center longitudinal axis of a ramp and which hang down from an elevated location in a truck and which are useful in determining a location of the ramp relative to the pair of strips.

A third continuing object of the invention is to provide a ramp safety guide that provides assistance in safely locating an elevated end of a ramp.

Briefly, a ramp safety guide that is constructed in accordance with the principles of the present invention has a center strip that hangs down from an overhead location toward the rear of a truck. When the truck is level, the center strip aligns with a center longitudinal axis of a ramp. A first modified ramp safety guide includes a pair of lateral strips, one each of the pair of lateral strips disposed on each side of the center longitudinal axis, that indicate where the longitudinal sides, or edges, of the ramp are located. A second modified ramp safety guide includes a parallel center strip that aligns with the center strip and which is disposed further away from the ramp than is the center strip. When the parallel center strip is visually aligned with the center strip and a first line so produced is projected toward the ramp, the first line aligns with the longitudinal axis. An alternate form of the second modified ramp safety guide includes a pair of parallel lateral strips, one each disposed on opposite sides of the longitudinal axis an amount equal to that which the pair of lateral strips is disposed and wherein each of the pair of parallel lateral strips is disposed further away from the ramp than are either of the lateral strips. When a first of the pair of parallel lateral strips is visually aligned with a first of the pair of lateral strips, and a second line so produced is projected toward the ramp, the second line aligns with a first longitudinal edge of the ramp. When a second of the pair of parallel lateral strips is visually aligned with a second of the pair of lateral strips, and a third line so produced is projected toward the ramp, the third line aligns with a second longitudinal edge of the ramp that is disposed on an opposite side of the longitudinal axis as is the first longitudinal edge. A third modified ramp safety guide includes a retractable center strip and/or retractable lateral strips. A fourth modified ramp safety guide includes any previously described or other possible version of the instant invention that is attached to an inside surface of an overhead type of door proximate a bottom edge of the overhead door. A fifth modified ramp safety guide is attached to an inside surface of an overhead door an elevated distance above a bottom edge thereof. A sixth modified ramp safety guide includes a plurality of retractable strips attached to a common frame. Any embodiment of the instant invention can be fixedly attached or detachably-attachable for example, with a hook and loop type of fastener, as desired.

DETAILED DESCRIPTION OF THE INVENTION

Figure 1:
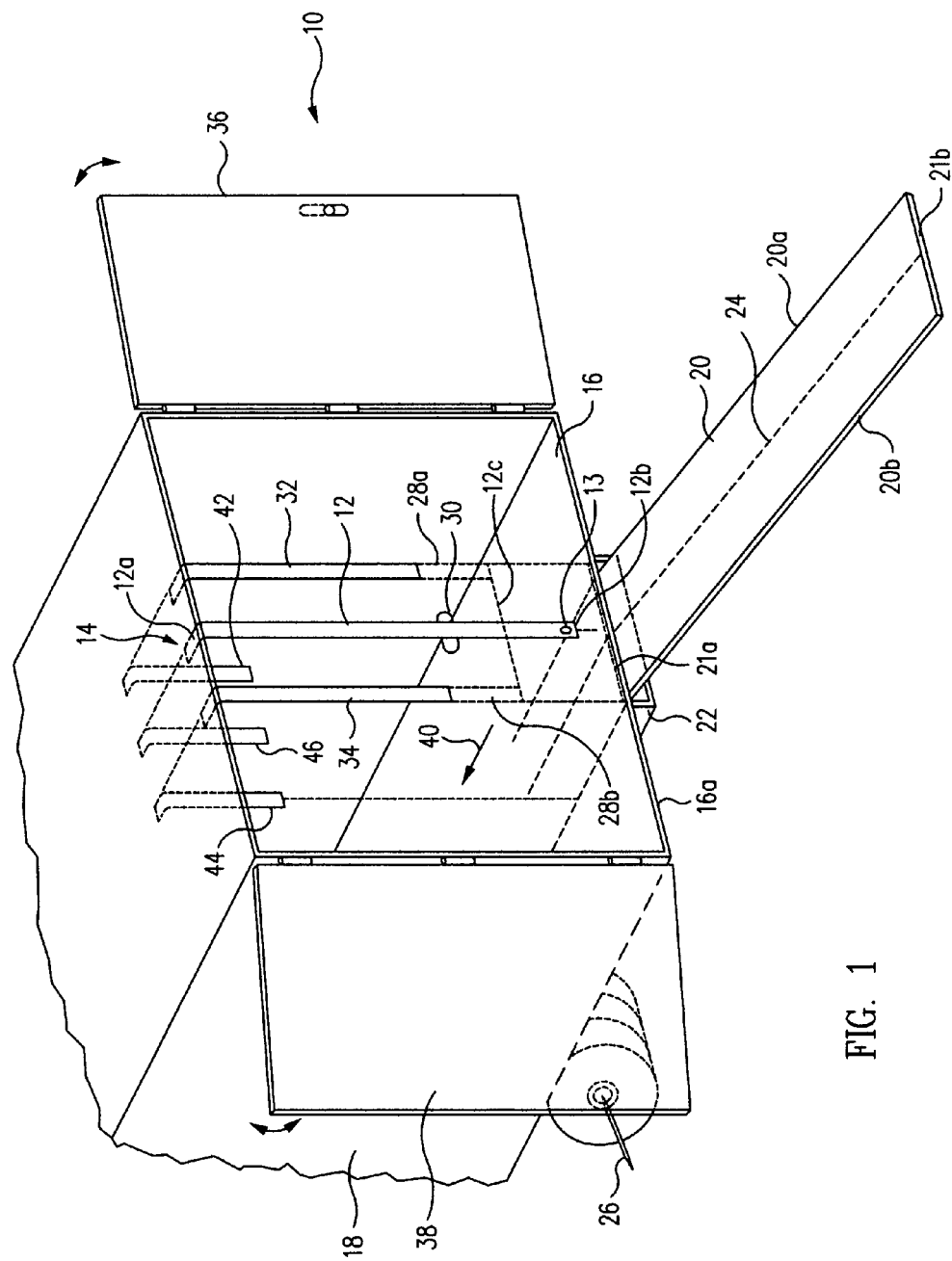
FIG. 1 is a view in perspective of a ramp safety guide attached to a ceiling of truck cargo-area interior along with a first and a second modified type of ramp safety guide.

Referring to FIG. 1 is shown, a ramp safety guide, identified in general by the reference numeral 10.

A center strip 12 is attached at an upper end 12a to a ceiling of the truck by any preferred method of attachment, identified in general by the reference numeral 14. The method of attachment 14 includes either an adhesive, a mechanical fastener, or a detachably-attachable fastener such as a hook and loop type of fastener.

A lower end 12b is disposed at an opposite end of the center strip 12 as compared to the upper end 12a thereof.

The length of the center strip 12 is a variable as is the material it is made from. Preferred materials include plastic, cloth, nylon, etc. It is preferable that it be provided in a bright color to aide visibility, such as bright yellow or bright orange. Fluorescent, phosphorescent, or other illuminated versions, such as by electrical or chemical means, that are better visible in darkness are also possible. Diagonal color markings, for example alternating yellow and black diagonal bands or orange and black diagonal bands or other color combinations are also possible for the center strip 12 or any other version (embodiment) of the instant invention.

As shown, the center strip 12 descends to within a couple of inches of a floor 16 of a truck 18. As is described in greater detail hereinafter, shorter lengths for the center strip 12 (or any other embodiment of the instant invention) are possible and for certain applications, preferred.

A ramp 20 includes an upper end 21a and an opposite lower end 21b. The upper end 21a is supported by a ramp receiver assembly 22 that is attached to the truck 18. When the ramp 20 is not in use it is stored in the ramp receiver assembly 22.

A longitudinal center axis 24 of the ramp 20 is shown in a dashed line extending down the entire length of the ramp 20 and also being extended beyond the ramp 20 and into the interior of the truck 18.

When the truck 18 is on level grade the upper end 12a, the lower end 12b, and the entire longitudinal length of the center strip 12 align with the longitudinal center axis 24 of the ramp 20. For shorter versions of the center strip 12, changes in alignment of the center strip 12 with respect to the longitudinal center axis 24 of the ramp 20 are visibly less noticeable when the truck 18 is not on a level grade.

During use, the truck 18 is parked on a surface that is level in a direction that is parallel with an axle 26 of the truck 18. This ensures that the center strip 12 will align with the longitudinal center axis 24 of the ramp 20.

Accordingly, a lead person (not shown) that is carrying an object (not shown, such as a piece of furniture or other cargo item), either with the assistance of a second person or alone, will align himself or herself with the center strip 12 before stepping off of the truck 18 and onto the ramp 20. They will then know with confidence that they will be stepping onto the ramp.

If the lead person is walking forward, it will be easy to glance upward and locate a portion of the center strip 12.

If the lead person is walking backward, the lead person can feel the center strip 12 make contact with the back of their head and torso if a longer version is utilized. They can then move side to side until the center strip 12 aligns with the center of their head and torso before continuing to proceed backward.

If the center strip 12 were to only descend a few inches from the truck's 18 ceiling, then the lead person would periodically glance upward as needed to verify the position of the center strip 12.

If two people are simultaneously carrying a cargo item out of the truck 18 and the lead person is backing up, then the trailing person who can easily see the center strip 12 can guide the lead person toward the center strip 12.

The center strip 12 is shown descending nearly to the floor 16 of the truck 18. This position may be preferred for many applications because it allows the person carrying cargo optimum opportunity to see the center strip 12.

However, the center strip 12 should not contact the floor 16 because if it did, it would not necessarily hang plumb (i.e., perpendicular to the level floor 16 of the truck 18). Accordingly, the center strip 12 could provide a false indication as to where the longitudinal center 24 of the ramp 20 is disposed. This could then result in miscalculation, misstep, and subsequent injury and/or cargo damage. If the center strip 12 is elevated any amount above the floor 16 it will hang plumb and therefore be of proper benefit.

If desired, a weight 13 can also be added proximate the lower end 12b of the center strip 12 (or used with any other embodiment, as described herein) to help keep the center strip 12 plumb during windy conditions. The weight 13 could be secured to the lower end 12b with a hook and loop fastener so that it could easily be removed when not needed.

During use with a longer version of the center strip 12 and if the person's view is obstructed when looking overhead (perhaps because of a bulky cargo item being carried), the person can instead look down toward their feet and see the lower end 12b of the center strip 12, which will then serve as a guide to direct the person to the longitudinal center 24 of the ramp 20.

Similarly, if the person's view is obstructed when looking downward, the person can look up toward a ceiling of the truck 18 to see the upper end 12a of the center strip 12, which will then serve as a guide to the longitudinal center 24 of the ramp 20.

This will help to prevent injury to the lead person, damage to the object, and will make unloading faster to accomplish, thereby also saving time and money.

The center strip 12 can, as previously mentioned, be made as long or as short as is desired. For some applications, a shorter strip will be preferred and may be deemed to be sufficiently informative as to the location of the longitudinal center 24 of the ramp 20 while also being minimally interfering with movement inside the truck 18.

The center strip 12 can also be made as wide or as thin as desired. If the center strip 12 includes a width that matches the width of the ramp 20, then a full wide center strip 12c (dashed lines) is provided. The full wide center strip 12c can be made of any preferred flexible material and include any preferred length, as can any embodiment of the instant invention. Cloth, plastic, or any suitable type of film stock are examples only and are not intended to limit the scope of materials that may be used.

The full wide center strip 12c includes a first edge 28a that aligns with a first edge 20a of the ramp 20 when the truck is level. The full wide center strip 12 similarly includes a second edge 28b that aligns with a second edge 20b of the ramp 20 when the truck 18 is level.

Accordingly, the overall width of the full wide center strip 12c indicates the location of the first edge 20a and the second edge 20b of the ramp 20. For certain applications this is preferred.

A further modification to the center strip 12 is to include an overall length thereof that is slightly less than the width of the ramp 20. Accordingly, the full wide center strip 12c so made will not be as wide as is the ramp 20. Therefore, the first edge 28a and the second edge 28b will be slightly indented inward with respect to the first edge 20a and the second edge 20b of the ramp 20. For example, a one inch indentation or other preferred magnitude of indentation with respect to the ramp edges 20a, 20b can be included to provide a safety margin. The safety margin compensates for errors in human perception, and slight misalignment of the ramp safety guide 10 during installation, and errors introduced by any incline that the truck may be disposed on.

A longitudinal center of the full wide center strip 12c can be visually approximated to determine the longitudinal center 24 of the ramp 20 or, if preferred, a center marking 30 can be added to the full wide center strip 12c to correspond with the longitudinal center 24 of the ramp 20. The center marking 30 as shown includes a circular shape although any shape or pattern can be used, as desired.

Different widths can be provided for the full wide center strip 12c to accommodate different widths of the ramp 20. However, this may not always be necessary. If an eighteen inch wide standard version of the full wide center strip 12c is used with a ramp 20 that is wider, for example 24 or 36 inches wide, then the narrower full wide center strip 12c will still provide an excellent indication of the center of ramp 20 while also including an indentation that provides added safety.

A first modified ramp safety guide includes a pair of lateral strips 32, 34. The center strip 12 can be included or omitted, as preferred. A first of the lateral strips 32 aligns with the first edge 20a of the ramp 20. A second of the lateral strips 34 aligns with the second edge 20b of the ramp 20.

According to one possible embodiment of the ramp safety guide 10, the outermost edges (i.e., those that are disposed closest toward the sides of the truck 18) of the pair of lateral strips 32, 34 align with the first and second edges 20a, 20b. This ensures that no portion of the pair of lateral strips 32, 34 is disposed beyond the first and second edges 20a, 20b, a consideration for added safety.

Although generally not preferable, it is nevertheless possible to align a longitudinal center of either or both of the lateral strips 32, 34 slightly beyond the first and second edges 20a, 20b. This will still provide an indication, in general, of the position of the ramp 20. The user will naturally and instinctively want to approach and enter the ramp 20 as near as possible to the longitudinal center 24 of the ramp 20.

If an additional visual aid is preferred, then the lateral strips 32, 34 may also be included along with the center strip 12. It may also be preferable to color code or otherwise provide a non-color based coded pattern (for the colorblind) to differentiate the center strip 12 apart from either of the lateral strips 32, 34.

The reason for this is to prevent a user from quickly glancing at this particular embodiment of the ramp safety guide 10 and, upon seeing the center strip 12, somehow mistakenly conclude that it is one of the lateral strips 32, 34. If that particular mistake were to occur, then the user would aim for one of the lateral strips 32, 34 thinking it was the center of the ramp 20 when actually it was disposed at, or slightly inward of, one of the edges 20a, 20b of the ramp 20.

This could result in the user stepping out of the truck 18 and perhaps missing entirely the ramp 20. However, if the center strip 12 has a unique appearance that differentiates it apart from the lateral strips 32, 34 such a mistake cannot possibly occur.

The center strip 12 and either of the lateral strips 32, 34 are attached to a ceiling of the truck 18. If the hook and loop or other type of detachably-attachable method of attachment 14 is used, they are removed before rolling down an overhead door (not shown) and are applied after the overhead door has been raised.

If side-swinging doors 36, 38 are used, then the center strip 12 and the lateral strips 32, 34 need not be removed regardless of the position of the side-swinging doors 36, 38.

The amount that the center strip 12 or either of the lateral strips 32, 34 are disposed away from a rear edge 16a of the truck floor 16 is also a variable. For certain situations, it is desirable to dispose the center strip 12 or either of the lateral strips 32, 34 as close as possible to the rear edge 16a. This location provides optimum accuracy in locating the longitudinal center 24 of the ramp 20 and is most preferred when the user will be walking in a forward direction, toward the ramp 20.

However, if the user is likely to be walking backward for any reason, it is preferable to dispose the center strip 12 or either of the lateral strips 32, 34 somewhat closer toward a front of the truck 18 in a direction as shown by arrow 40. This will allow additional floor 16 area to be disposed between the strips 12, 32, 34 (whichever ones are present) and the rear edge 16a of the truck floor 16. Often, when unloading heavy or large items, two people are required. The person closest to the rear edge 16a is likely to be walking backward whereas the remaining person is likely to be walking forward.

Disposing the strips 12, 32, 34 somewhat closer toward the front of the truck 18 (i.e., further away from the rear edge 16a) provides opportunity for the person that is walking backward to glance overhead and determine the location of the strips 12, 32, 34. The person can then shift their position side to side to align with the center strip 12 before continuing to walk backward. If longer versions of any of the strips 12, 32, 34 are used, then as the user backs up he or she can contact the center strip 12 or one of the lateral strips 32, 34 and by tactile means determine the location of all of the strips 12, 32, 34. The user would then also determine, either by tactile means or again by glancing upward, the location of the center strip 12 before continuing to proceed backward.

Of course, the center strip 12 can be eliminated if desired with only the lateral strips 32, 34 present. In that situation, the user would center him (or her) between the two lateral strips 32, 34 before continuing to walk backward. If the user is walking forward instead of backward, a similar centering would, of course, occur before stepping off of the truck floor 16 and onto the ramp 20. The extra floor 16 area allows an added margin of error for the user to better reposition himself (or herself) before continuing to back up and step off of the truck 18 floor 16 onto the ramp 20.

A second modified ramp safety guide includes either embodiment, as previously described, with the addition of either a first parallel lateral strip 42 and a second parallel lateral strip 44, or a parallel center strip 46 (with or without inclusion of the first parallel lateral strip 42 and the second parallel lateral strip 44) that is or are attached to the ceiling of the truck 18.

Each (i.e., the first parallel lateral strip 42, the second parallel lateral strip 44, and the parallel center strip 46, as included) is disposed a predetermined distance away from the rear edge 16a of the floor 16 in the direction of arrow 40. The first parallel lateral strip 42, the second parallel lateral strip 44, and the parallel center strip 46 are disposed a greater distance from the rear edge 16a of the truck 18 than are the center strip 12 or either of the lateral strips 32, 34.

The first parallel lateral strip 42, the second parallel lateral strip 44, and the parallel center strip 46 are not used without the corresponding center strip 12 or either of the corresponding lateral strips 32, 34. Both are required for the second modified ramp safety guide.

There are five possible configurations for the second modified ramp safety guide. If the center strip 12 is used without the lateral strips 32, 34, then a version of the second modified ramp safety guide is provided by also including the parallel center strip 46 only.

If the two lateral strips 32, 34 are used without the center strip 12, then a second version of the second modified ramp safety guide is provided by also including the first parallel lateral strip 42 and the second parallel lateral strip 44 only.

If the two lateral strips 32, 34 are used along with the center strip 12, then a third version of the second modified ramp safety guide is provided by also including the first parallel lateral strip 42 and the second parallel lateral strip 44 only.

If the two lateral strips 32, 34 are used along with the center strip 12, then a fourth version of the second modified ramp safety guide is provided by also including the parallel center strip 46 only.

If the two lateral strips 32, 34 are used along with the center strip 12, then a fifth version of the second modified ramp safety guide is provided by also including the first parallel lateral strip 42, the second parallel lateral strip 44, and the parallel center strip 46.

Accordingly, it can be appreciated that the second modified ramp safety guide requires both a rearward element (i.e., either the center strip 12 only, or the pair of lateral strips 32, 34 only, or the center strip 12 along with the pair of lateral strips 32, 34) and at least one less-rearward element (i.e., either the parallel center strip 46 only, or the pair of first and second parallel lateral strips 42, 44 only, or the parallel center strip 46 along with the pair of first and second parallel lateral strips 42, 44) in one of the combinations as previously described.

The benefit of any of these possible combinations is described in greater detail hereinafter.

The parallel center strip 46 is also in alignment with the longitudinal center 24 of the ramp 20.

The first parallel lateral strip 42 is disposed as far from the longitudinal center 24 of the ramp 20 as is the first lateral strip 32. The second parallel lateral strip 44 is disposed as far from the longitudinal center 24 of the ramp 20 as is the second lateral strip 34.

Accordingly the first parallel strip 42, when visually aligned with the first lateral strip 32, also aligns with the first edge 20a of the ramp 20.

Similarly, the second parallel strip 44, when visually aligned with the second lateral strip 34, also aligns with the second edge 20b of the ramp 20.

Therefore the user can use the first and second parallel strips 42, 44 together with the first and second lateral strips 32, 34, respectively, to better determine where the edges 20a, 20b of the ramp 20 are located. This is done by looking at them and then projecting an imagined line between each pair that extends out toward the rear edge 16a of the truck floor 16 in a direction opposite to that as shown by arrow 40.

A very accurate approximation as to where the edges 20a, 20b of the ramp 20 are located is thereby provided.

Therefore, the parallel center strip 46, when visually aligned with the center strip 12, also aligns with the longitudinal center 24 of the ramp 20. If the user similarly looks at the parallel center strip 46 and the center strip 12, imagines a line there-between, and then projects that particular imagined line toward the rear edge 16a of the truck floor 16 in a direction opposite to that as shown by arrow 40, a very accurate approximation as to the location of the longitudinal center 24 of the ramp 20 is provided.

Accordingly, any version of the second modified ramp safety guide provides greater accuracy in locating the longitudinal center 24 of the ramp 20 or the edges 20a, 20b of the ramp 20, or both the longitudinal center 24 and edges 20a, 20b of the ramp 20.

The amount that the first parallel lateral strip 42, the second parallel lateral strip 44, and the parallel center strip 46 are disposed further toward the front of the truck (in the direction of arrow 40) is a variable that depends on the preference of the user, the size of the truck 18, and ease of use.

The color, pattern, width, length, and material used for the first and second parallel strips 42, 44 and for the parallel center strip 46 can also be varied, as desired.

Figure 2:
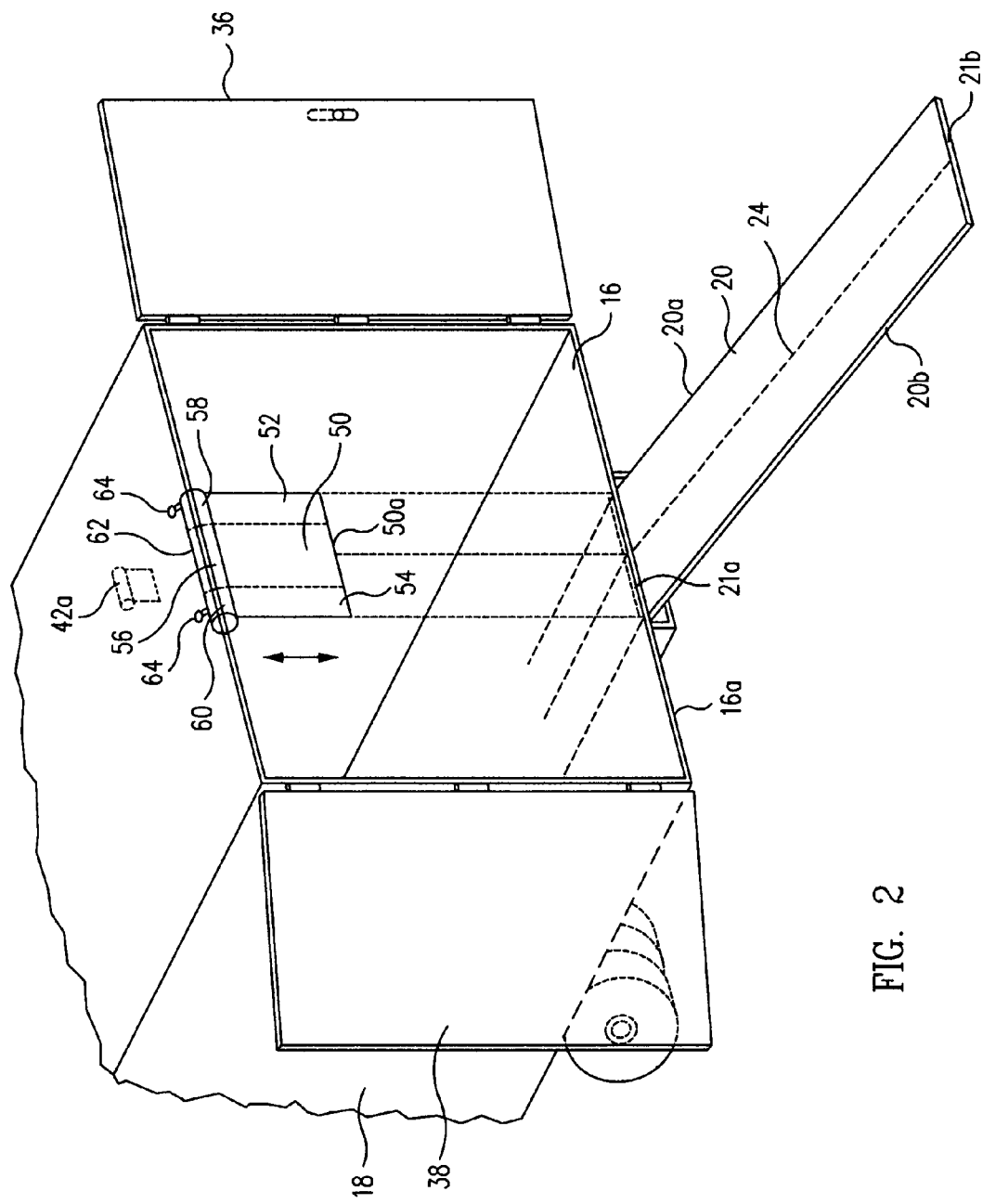
FIG. 2 is a view in perspective of a third modified retractable ramp safety guide.

Referring now primarily to FIG. 2, a third modified ramp safety guide is shown that includes a retractable center strip 50 and/or a pair of retractable lateral strips 52, 54. This embodiment is preferred for many applications.

The retractable center strip 50 can be used with or without the retractable lateral strips 52, 54. It is also possible to use the retractable center strip 50 with the non-retractable lateral strips 32, 34.

The retractable center strip 50 can be of any preferred width, similar to that as was described above for the non-retractable lateral strips 32, 34. The retractable center strip 50 can also include any preferred flexible material, color, pattern, etc., similar to that as described above for the non-retractable center strip 12.

The retractable lateral strips 52, 54 can be used with or without the retractable center strip 50 or the non-retractable center strip 12. The retractable lateral strips 52, 54 can include any preferred flexible material, color, pattern, etc., similar to that as described above for the non-retractable lateral strips 32, 34.

In the illustration, dashed lines separate the retractable lateral strips 52, 54 from the retractable center strip 50. This is done to show that, if preferred, the retractable center strip 50 can be expanded in width by eliminating the dashed lines that separate it from the retractable lateral strips 52, 54 and making the retractable center strip 50 as wide as all three retractable strips (50, 52, 54) combined.

The combined width, as shown in the illustration, is equal to the width of the ramp 20.

The retractable center strip 50 retracts into a center spool 56. Any preferred mechanism is possible that allows drawing down of the center strip 50 from the center spool 56, retention of a lower end 50a of the retractable center strip 50 at the preferred elevation above the floor 16 of the truck 18, and retraction back into the center spool 56 when desired.

A common retractable window blind mechanism (not shown) that includes the retractable center strip 50 (made of the desired material) exemplifies one possible type of construction for the retractable center strip 50.

A first retractable lateral strip 52 of the pair of retractable lateral strips 52, 54 similarly retracts into a comparably-designed first lateral spool 58.

A second retractable lateral strip 54 of the pair of retractable lateral strips 52, 54 similarly retracts into a comparably-designed second lateral spool 60.

The width of any of the spools 56, 58, 60 can be varied, as desired. Their inclusion is, of course, dependent upon which of the corresponding retractable strips 50, 52, 54 are used and in what combination.

An advantage of the third modified ramp safety guide is that any of the retractable strips 50, 52, 54 can be raised when they are not needed, for example, when the truck 18 is against a loading dock and location of the ramp 20 is not at all necessary. Similarly, they can be raised (i.e., retracted) when loading the truck 18 and drawn out (i.e., extended down) when the truck 18 is being unloaded. This is significant because during loading of the truck 18, determining the location of the ramp 20 is not deemed to be nearly as important as determining the ramp 20 location during unloading.

A further advantage of the third modified ramp safety guide is that any of the retractable strips 50, 52, 54 can be lowered to any degree that is desired. For example, they can be lowered only a few inches down from the ceiling when unloading the truck 18 or they can be lowered to just above the floor 16 of the truck, as preferred.

It is important to note that when all three retractable strips 50, 52, 54 are used simultaneously, it is possible to keep the three corresponding spools 56, 58, 60 separate or attached together to a common member, as preferred.

If they are separate, then increased flexibility is provided in that the center retractable strip 50 and center spool 56 can be used alone (i.e., without the lateral retractable strips 52, 54) if preferred. Similarly, the lateral retractable strips 52, 54 and the corresponding lateral retractable spools 58, 60 can be used without the center retractable strip 50 if the spools are not mechanically attached to each other.

Conversely, if they are joined, it is easier to install the three spools 56, 58, 60 as a single assembly.

The spools 56, 58, 60 may be attached by any preferred permanent fastener or by the use of the hook and loop fastener 62 or permanently affixed by any preferred means. This allows easy detachment of the spools 56, 58, 60, as desired.

If preferred, the spools 56, 58, 60 are attached by a plurality of fasteners 64, such as bolts and nuts or screws or adhesive.

A modified retractable first parallel strip 42a (dashed lines, FIG. 2) is also shown to illustrate that any version of the second modified ramp safety guide can be further modified so as to be retractable. Clearly, the advantages thereof are similar to that which has been previously described for the component parts of any version of the third modified ramp safety guide.

Figure 3:
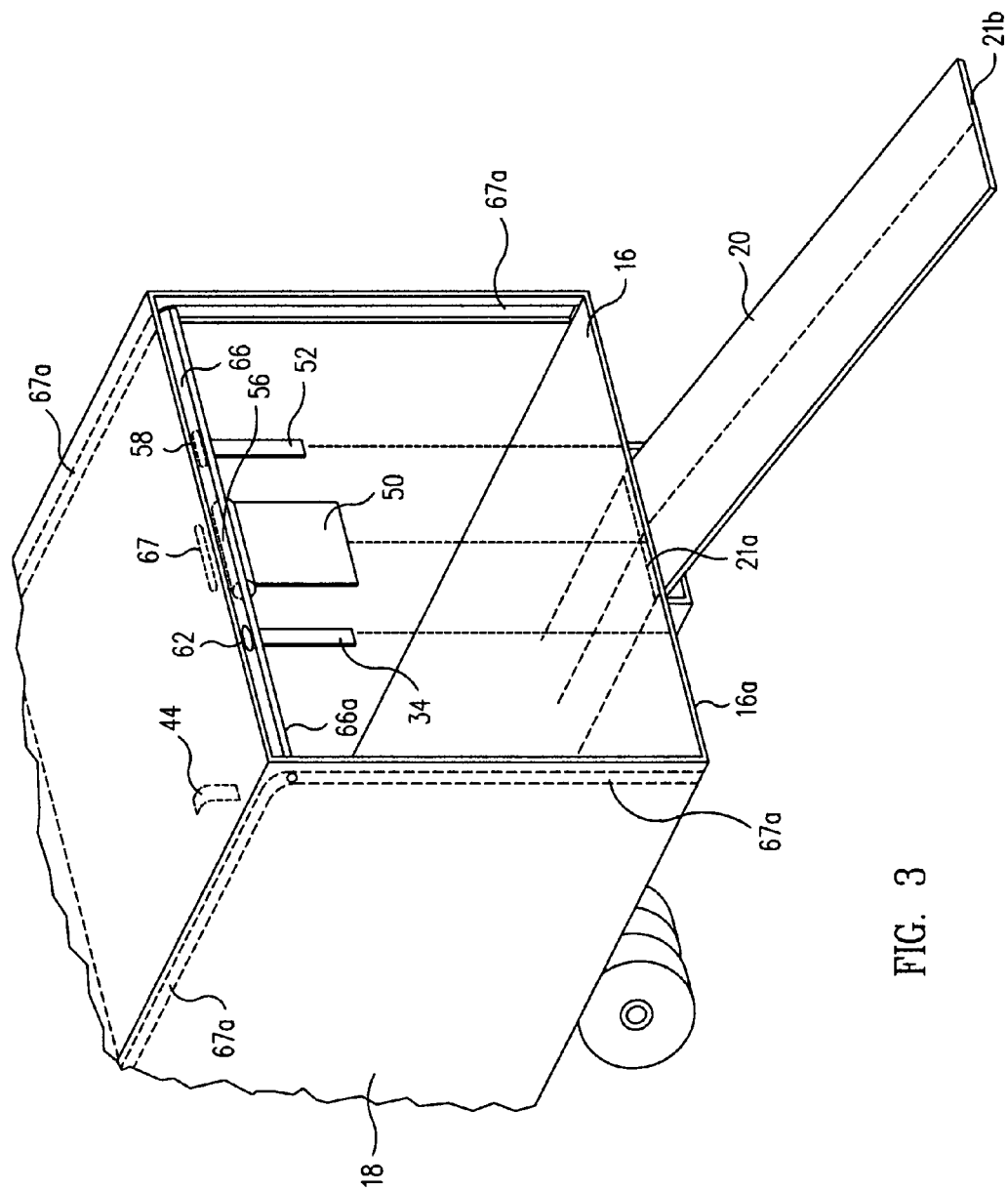
FIG. 3 is a view in perspective of a fourth modified ramp safety guide that is attached to an overhead door of a truck.

Referring now to FIG. 3, an overhead door 66 is disposed in a raised position in the truck 18. A latch 67 is shown in dashed lines because it is disposed under a roof of the truck 18. The overhead door 66 rides in a pair of parallel, spaced-apart rails 67a that are attached to the sidewalls of the truck 18. The use of the overhead door 66 is well-known.

A fourth modified ramp safety guide, as is described in greater detail hereinafter, includes any version or variation of the instant invention that has been previously described with one difference. Instead of being attached to the ceiling of the truck 18, the fourth modified ramp safety guide is attached to an inside surface of the overhead door 66, near a bottom 66a thereof. Examples are described hereinafter.

It is possible to attach any version of the retractable or the non-retractable ramp safety guide to the overhead door 66 instead of to the ceiling of the truck 18.

The second lateral strip 34 (FIG. 3) is shown as being attached to an inside surface of the overhead door 66 by use of any preferred permanent fastener or by the use of the hook and loop fastener 62. Of course, other methods of attachment are possible. The second lateral strip 34 is attached near to the bottom 66a of the overhead door 66 so that when the overhead door 66 is disposed in a raised, open position (as shown in FIG. 3), the second lateral strip 34 will be disposed sufficiently close to the rear edge 16a as is desired. This is preferred for the same reasons as have been previously described.

The second lateral strip 34 is shown to illustrate how any non-retractable embodiment of the invention, for example the center strip 12, the first lateral strip 32, the first parallel strip 42, the second parallel strip 44, or the parallel center strip 46 can be similarly used, if desired, with the overhead door 66.

However, because the second lateral strip 34 is non-retractable, it may be desirable to be able to detach it from the overhead door 66 so that, when the overhead door 66 is closed, it will not protrude out of the truck 18 from under the bottom 66a of the overhead door 66. For that reason the hook and loop fastener 62 is a preferred form of attachment of the second lateral strip 34 to the overhead door 66.

It is, of course, also possible to make the second lateral strip 34 shorter so that it will not protrude excessively out from under the bottom 66a of the overhead door 66 when the overhead door 66 is closed.

If included with the overhead door 66 any of the center strip 12, the first lateral strip 32, the first parallel strip 42, the second parallel strip 44, and the parallel center strip 46 can also be made shorter, as desired, so that they too will not protrude excessively out from under the bottom 66a of the overhead door 66.

According to virtually all preferred embodiments of the invention, it is desirable that there be no protruding by any portion of the invention when either the overhead door 66 or the side-swinging doors 36, 38 are closed. Clearly, protrusion out of the enclosed cargo space of the truck 18 is not desirable.

Figure 4:
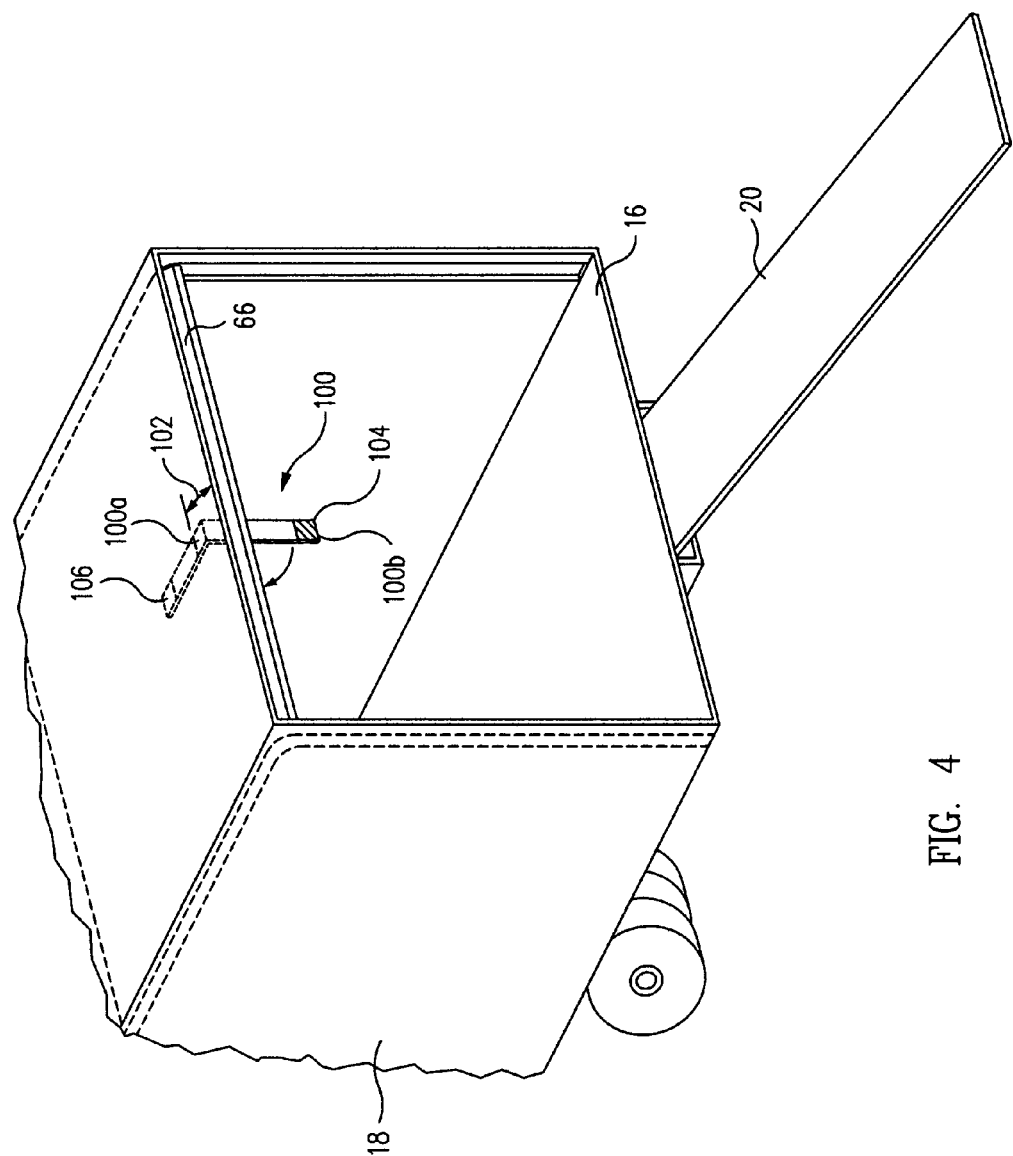
FIG. 4 is a view in perspective of a fifth modified ramp safety guide that is attached to an overhead door of a truck.

A method of accomplishing this is described in greater detail hereinafter and is shown in FIG. 4.

The second parallel lateral strip 44 is also shown to illustrate that any version of the second modified ramp safety guide can be further modified so as to be included with the fourth modified ramp safety guide, if desired. This is, of course, true for non-retractable and retractable versions, thereof.

A center retractable strip 50 that cooperates with the center spool 56 is included. The center spool 56 is attached to an inside of the overhead door 66 by any preferred permanent fastener or by the use of the hook and loop fastener 62. Its operation is as previously described, only it is now attached to the overhead door 66 near the bottom 66a thereof.

Similarly, a first retractable lateral strip 52 that cooperates with the first lateral spool 58 is included. The lateral spool 58 is also preferably attached to an inside of the overhead door 66 by any preferred permanent fastener or by the use of the hook and loop fastener 62.

If a retractable version of the fourth modified ramp safety guide is used, the retractable strips 50, 52, 54 (as may be included, 54 not being shown in FIG. 3) are fully retracted into their spools 56, 58, and 60, respectively after unloading of the truck 18 is complete and prior to a lowering of the overhead door 66.

When the overhead door 66 is raised and the truck 18 is loaded, the retractable strips 50, 52, 54 (54 not being shown in FIG. 3) are maintained in the fully retracted position disposed within their spools 56, 58, 60. When the truck 18 is to be unloaded, the retractable strips 50, 52, 54 (54 not being shown in FIG. 3) are then extended down to the degree (i.e., to the length) that is desired.

Other enhancements are also possible. For example, it may be desirable to provide a unique color scheme for any embodiment of the ramp safety guide that includes a particular first color (or combination of first colors) for the center strip 12 or the retractable center strip 50 and a different second color (or combination of second colors) for the first lateral strip 32 and the first retractable lateral strip 52, and a different third color (or combination of third colors) for the second lateral strip 34 and the second retractable lateral strip 54. If desired, any method of providing illumination, such as mentioned hereinbefore, can also be utilized, for example fluorescent, phosphorescent, chemical, or electrical means. Safety markings, for example the diagonal lines also mentioned hereinbefore, can also be included.

That way, the user would associate the first color with the center of the ramp 20 and the second color with the edge of the ramp 20 that is disposed on the passenger side of the truck 18 and the third color with edge of the ramp 20 that is disposed on the driver's side of the truck 18. A mere glance and recognition of which color is used will help orient the user with respect to the location of the ramp 20 and thereby further improve safety.

Additional modifications are also possible. For example, the first and second lateral strips 32, 34 need not be disposed in alignment with the edges of the ramp 20. It is preferable for many applications that they be disposed inward from the edges, closer to the longitudinal center axis 24 by a predetermined amount, for example, two or three inches. This would provide a visual indication of a narrower ramp 20 than it is in reality. This, in turn, would provide an even greater margin of safety encouraging users not to wander too close to the edges.

Referring now to FIG. 4 a fourth modified ramp safety guide, identified in general by the reference numeral 100, is shown and is attached to the overhead door 66 of the truck 18.

When the overhead door 66 is in the fully raised position, as shown, the fourth ramp safety guide 100 is disposed a preferred distance back from the rear edge 16a of the truck floor 16, as shown by arrow 102. A preferred distance is about two feet from the rear edge 16a.

Depending on the location of the bottom of the overhead door 66 with respect to the rear edge 16a when the overhead door 66 is raised, the fourth ramp safety guide 100 may be attached to the overhead door at the preferred distance back from a bottom of the overhead door 66 or a little more or less. The ideal point of attachment is determined to ensure that when the overhead door 66 is raised, the fourth ramp safety guide 100, when hanging, will point downward and toward a location that is about two feet (i.e., at the preferred distance back) from the rear edge 16a of the truck floor 16. This particular embodiment is generally preferred for use with the overhead door 66 for several reasons.

The fourth ramp safety guide 100 is preferably attached to the inside surface of the overhead door 66 at a first end 100a thereof by use of an adhesive or by any preferred fastener. It does not need to be entirely detachable apart from the overhead door 66. As such, attachment is inexpensive.

The preferred distance (arrow 102) that the fourth ramp safety guide 100 is back from the rear edge 16a provides easy overhead glancing and correction before proceeding onto the upper portion of the ramp 20. This optimizes safety by providing a corrective buffer zone before contact with ramp 20, and a subsequent stepping off of the truck floor 16, occurs.

A bottom portion of the fourth ramp safety guide 100 includes a portion of a first half of a hook and loop fastener 104 attached at a second end 100b of the fourth ramp safety guide 100 that is distally disposed with respect to the first end 100a.

A corresponding portion of a second half of a hook and loop fastener 106 is attached to the inside of the overhead door 66 a distance away from the where the fourth ramp safety guide 100 is attached to the overhead door 66 (i.e., the first end 100a) that is nearly equal in length to that portion of the fourth ramp safety guide 100 that hangs down (i.e., extends) from the overhead door 66.

When the fourth ramp safety guide 100 is not needed as a visible safety reference, for example, during transit, the first half of a hook and loop fastener 104 is pressed against the second half of a hook and loop fastener 106. This secures the fourth ramp safety guide 100 against an inside surface of the overhead door 66. This, in turn, ensures that no portion of the fourth ramp safety guide 100 can protrude out from the bottom of the overhead door 66 when it is closed. It also prevents any portion of the fourth ramp safety guide 100 from contacting the floor 16 where it might become soiled, discolored, or otherwise be damaged.

It also provides an unexpected benefit when the ramp 20 is not used, for example, when the truck 18 is backed up until it is in contact with an elevated loading platform that extends fully across the width of the truck 18 and is at the height of the floor 16. In this situation, the fourth ramp safety guide 100 is not needed as there is no danger of missing the ramp 20 or of falling. Accordingly, the fourth ramp safety guide 100 is allowed to remain in the elevated position.

The ability to utilize the fourth ramp safety guide 100 only when it is needed for ramp 20 safety and not use it when it is not needed provides yet another unexpected benefit. It underscores the meaning of the device when it is suspended. The user learns to be cautious and to rely on the fourth ramp safety guide 100 if it visibly descends (i.e., hangs) down and to ignore it otherwise. This provides a conditioning effect that further reinforces reliance on the instant invention when it matters.

If desired, the fourth ramp safety guide 100 can of course be used with the swinging doors 36, 38 as well as the overhead door 66. During its actual use as a guide to locate the ramp 20 it must be attached to an overhead location and not to the swinging doors 36, 39. When modified for use with the swinging doors 36, 38 and when its active use is not required (such as during transit) the fourth ramp safety guide 100 is secured (by hook and loop fasteners disposed at each end thereof and by corresponding hook and loop fasteners that are attached to the swinging doors 36, 38) to the swinging type of doors 36, 38. When used for safety, the modified type of fourth ramp safety guide 100 is detached from the swinging doors and attached to a location on the roof of the truck 18, preferably by a corresponding half of a hook and loop fastener, that is disposed at a location that is disposed about two feet in from the rear edge 16a of the floor 16 and in the center of the ramp 20.

Any of the previously described modifications may also be applied to the fourth ramp safety guide 100, for example, the use of a plurality of indicators, full width indication, etc.

Figure 5:
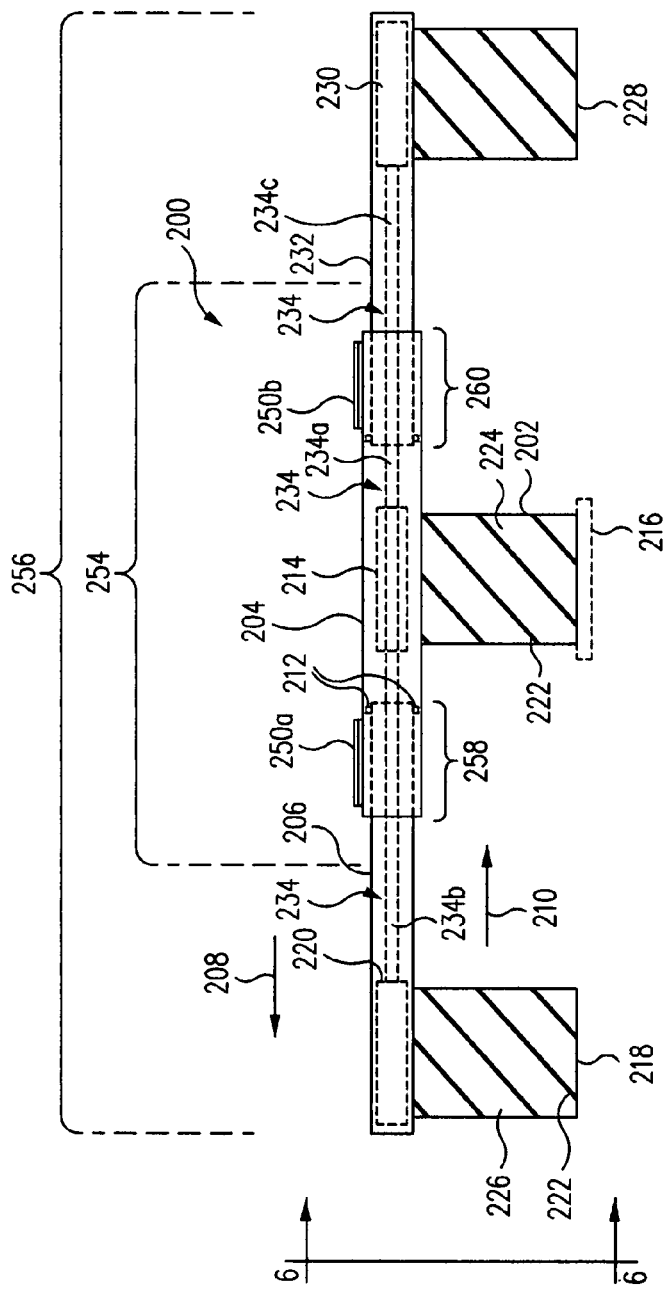
FIG. 5 is a plan view of a sixth modified ramp safety guide that includes a plurality of retractable strips attached to a common supporting frame structure.
Figure 6:
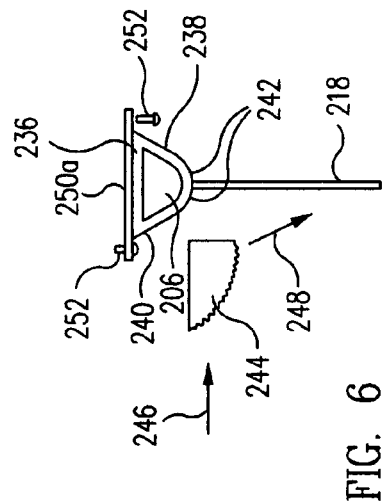
FIG. 6 is a side view of the sixth modified ramp safety guide taken along the line 6-6 of FIG. 5.

Referring now to FIG. 5 and to FIG. 6 is shown a sixth modified ramp safety guide 200 that includes embodiments which are especially preferred for most applications. The sixth modified ramp safety guide 200 includes a center retractable strip 202 that is attached to a center frame member 204.

A left extensible frame member 206 includes a cross-sectional shape (see FIG. 6) that corresponds with that of the center frame member 204. The outside dimensions of the left extensible frame member 206 are slightly less than corresponding inside dimensions of the center frame member 204 so that a portion of the left extensible frame member 206 is able to fit inside of the center frame member 204 and extend therefrom as shown by arrow 208 and also to retract therein as shown by arrow 210.

The left extensible frame member 206 is urged in or out of the center frame member 204 by grasping it and pulling it away from the center frame member 204 or pushing it further into the center frame member 204. A sufficient amount of friction between the center frame member 204 and the left extensible frame member 206 retains the left extensible frame member 206 in a position where it was urged.

A stop ring 212 is attached to the inmost end of the left extensible frame member 206. The stop ring 212 limits the amount the left extensible frame member 206 can be extended in the direction of arrow 208 with respect to the center frame member 204, thereby preventing the left extensible frame member 206 from being urged completely out of cooperation with the center frame member 204.

The center retractable strip 202 extends out through a slot provided in the center frame member 204. A center reel 214 (dashed lines) that is similar to a type of mechanism used to retract a window blind (not shown) is disposed above the slot in the center frame member 204 and is attached to the center frame member 204 along a center of its longitudinal length.

The center retractable strip 202 is extended, as shown, during use by pulling it down and away from the center frame member 204. To retract the center retractable strip 202, it is grasped and pulled again to disengage a catch in the center reel 214 and therefore to allow the center reel 214 to retract (i.e., reel) the center retractable strip 202 back into the center frame member 204 and around the center reel 214.

The amount of retraction possible by the center retractable strip 202 is either limited by the action of the center reel 214 so as not to over retract the center retractable strip 202 into the center frame member 204 or an optional stop rod 216 is added to the end of the center retractable strip 202 to prevent it from retracting beyond the slot and fully into the center frame member 204. The stop rod 216, if included, also makes it easier to grasp and pull the center retractable strip 202.

A left retractable strip 218 is attached to a left reel 220. The left retractable strip 218 is similar, but preferably not identical, to the center retractable strip 202.

Ideally, the center retractable strip includes black diagonal stripes 222 over an orange background 224. Other colors can, of course, be used instead of those proposed. However, this pattern (i.e., in general, diagonal lines over a solid background color) is a pattern that is generally associated with a warning or message of caution. If possible, the orange background 224 includes a highly visible or fluorescent color. Ideally, the pattern for the center retractable strip 202 is visible on opposite sides thereof to guide the user regardless of which side of the center retractable strip 202 is being viewed. This would also allow the sixth modified ramp safety guide 200 to be installed as shown or rotated 180 degrees and then installed.

The left reel 220 is attached proximate an end of the left extensible frame member 206 that is opposite with respect to an end where the stop ring 212 is located. The left reel 220 is similar to the center reel 214. If desired, an additional stop rod (not shown, identical to the stop rod 216) is attached at an exposed end of the left retractable strip 218.

The left retractable strip 218 extends from the left extensible frame member 206 through a left slot (not shown). The left retractable strip 218 preferably also includes the black diagonal strips 222 and a yellow background color 226 that preferably is also highly visible or fluorescent.

It is especially desirable that the left retractable strip 218 include a background color that is different from that of the center retractable strip 202 so the user can, at a glance, determine where in relation to the ramp 20 the user is positioned. The appearance pattern for the left retractable strip 218 is preferably also visible on both sides thereof.

A right retractable strip 228 is attached to a right reel 230. The right reel 230 is attached to a right extensible frame member 232. The right retractable strip 228 extends out of the right extensible frame member 232 through a right slot (not shown). The right retractable strip 228, right reel 230, and right extensible frame member 232 are essentially a mirror image of the left retractable strip 218, left reel 220, and left extensible frame member 206. The color and pattern for the right retractable strip 228 can be identical to that of the left retractable strip 218 or a different background color can be included.

A center longitudinal telescoping connecting rod, identified in general by the reference numeral 234 extends through the left extensible frame member 206, center frame member 204, and right extensible frame member 232 connecting a center of the left reel 220, center reel 214, and right reel 230 together.

The center longitudinal connecting rod 234 includes a cross-section that is other than round, for example square. This ensures that when either a center connecting rod 234a portion, a left connecting rod 234b portion, or a right connecting rod 234c portion of the center longitudinal connecting rod 234 is rotated, the other remaining portions thereof will also rotate accordingly, less any tolerance that exists between the telescoping center, left and right connecting rod portions (234a, 234b, 234c) thereof. It is also possible to use a key that engages with a longitudinal slot. This would permit a round cross-section, if desired.

The left and right connecting rod portions 234b, 234c fit into and slide longitudinally within the center connecting rod portion 234a. The center connecting rod portion 234a is secured to the center reel 214. The left connecting rod portion 234b is secured to the left reel 220. The right connecting rod portion 234c is secured to the right reel 230. Accordingly, the left and right connecting rod portions 234b, 234c extend into or retract from the center connecting rod portion 234a as the left extensible frame member 206 and right extensible frame member 232 are extended or retracted with respect to the center frame member 204.

Accordingly, when either the left retractable strip 218, the center retractable strip 202, or the right retractable strip 228 is extended or retracted, the remainder thereof also does the same.

While any size is possible for the center, left, and right retractable strips 202, 218, 228 a generally preferred size for most applications includes an extended visible vertical length of from about twelve to eighteen inches and a width (for each strip) of from about one to five inches.

While any cross-sectional shape is possible for the sixth modified ramp safety guide 200, a generally rounded profile is desired. A preferred cross-sectional profile for the sixth modified ramp safety guide 200 (or any other version of the instant invention) includes a generally flat mounting surface 236 to aid in mounting and attaching the sixth modified ramp safety guide 200 to a surface that will be disposed overhead in the truck 18 (not shown in FIG. 5 or FIG. 6) during use.

A pair of curved and inwardly sloping opposite sides 238, 240 that begin at the mounting surface 236 and merge toward each other as the distance from the mounting surface 236 increases are provided. A curved bottom 242 is provided intermediate a bottom edge of each of the sloping opposite sides 238, 240.

The preferred cross-sectional profile, as described above, provides an unexpected benefit. To illustrate this, a cargo item 244 (partially shown) is being carried either out of or into the truck 18 in a direction as shown by arrow 246. If the cargo item 244 is excessively elevated it can come into contact (i.e., bump into) either the center frame member 204, the left extensible frame member 206, or the right extensible frame member 232.

When such inadvertent contact occurs, the rounded bottom profile does not abruptly stop motion of the cargo item 244 in the direction of arrow 246. If the cross-sectional profile were, instead, to present an abutment (instead of being rounded or curved, as preferred), it would absorb the kinetic energy of the cargo item 244 and thereby bring it to an abrupt stop. This is potentially damaging to the sixth modified ramp safety guide 200 (or any other version of the instant invention). A sudden stop would also jar the user, which would be unpleasant to experience.

When inadvertent contact occurs between the cargo item 244 and the preferred rounded profile version of the sixth modified ramp safety guide 200, the cargo item 244 is deflected downward, as shown by arrow 248 an amount sufficient to lower it and allow it to pass under the sixth modified ramp safety guide 200 while the cargo item 244 continues motion also in the direction of arrow 246. This significantly reduces the likelihood of damaging the sixth modified ramp safety guide 200 caused by impact with the cargo item 244. It also greatly reduces the jolt felt by the user.

A pair of mounting pads 250a, 250b are attached at opposite ends to the mounting surface 236 and are used to secure the sixth modified ramp safety guide 200 overhead to the truck 18. A first half of a hook and loop fastener or an adhesive is attached to the mounting pads 250a, 250b. If desired, the mounting pads 250a, 250b can extend beyond the width of the sixth modified ramp safety guide 200 and be secured to the truck 18 by preferred fasteners 252.

The sixth modified ramp safety guide 200, when fully retracted, includes a minimum overall length as shown by bracket 254. When maximally extended, the sixth modified ramp safety guide 200 includes a maximum overall length as shown by bracket 256. The sixth modified ramp safety guide 200 can be set to any length therebetween.

Accordingly, the sixth modified ramp safety guide 200 can be optimally set to function with the width of the ramp 20 that is being used. If, for any reason, the ramp 20 is removed and a different width of a ramp (not shown) is used (either wider or narrower), the sixth modified ramp safety guide 200 is adjusted to match. If the width of the ramp 20 is expected to be constant then the sixth modified ramp safety guide 200 is preferably screwed in place or otherwise secured after adjustment so that it maintains the desired width.

Ideally, the sixth modified ramp safety guide 200 is set so that the outermost edges of the left retractable strip 218 and the right retractable strip 228 are disposed about two inches inward of the outer edges (i.e., the width) of the ramp 20. This is to provide a safety margin to ensure that the user does not miss the ramp 20.

The center frame member 204 remains centered when the left retractable strip 218 and the right retractable strip 228 are extended or retracted. Therefore, the center retractable strip 202 also remains centered. This is important because it ensures that the center retractable strip 202 will always indicate the longitudinal center 24 of the ramp 20.

Therefore, the left extensible frame member 206 and the right extensible frame member 232 are extended or retracted with respect to the center frame member 204 an equal amount. It is therefore also desirable to make further modification to the sixth modified ramp safety guide 200 and mechanically couple the left extensible frame member 206 and the right extensible frame member 232 together wherein if one of them is either urged further into the center frame member 204 or extended therefrom, the remaining one of them automatically does the same. This would facilitate use and ensure that both the left extensible frame member 206 and the right extensible frame member 232 are evenly disposed with respect to the center frame member 204.

When the left extensible frame member 206 and the right extensible frame member 232 are maximally extended with respect to the center frame member 204 a first overlap 258 is provided wherein a portion of the left extensible frame member 206 remains disposed in the center frame member 204 and a second overlap 260 is provided wherein a portion of the right extensible frame member 232 remains disposed in the center frame member 204. The first overlap 258 and the second overlap 260 provide structural mechanical integrity sufficient to retain the left extensible frame member 206 and the right extensible frame member 232 in position relative to the center frame member 204.

The sixth modified ramp safety guide 200 is preferably mounted in the truck 18 about two feet inward (i.e., toward the front of the truck 18) with respect to the rear edge 16a of the truck floor 16 for reasons as were discussed hereinbefore for other versions of the instant invention.

It is possible to provide a seventh modified ramp safety guide (not shown) that is identical to the sixth modified ramp safety guide 200 but which does not telescope (i.e., extend or retract). The seventh modified ramp safety guide is provided in one or more standard sizes to correspond with the width of a variety of the sizes of the ramp 20 while preferably maintaining the outermost edges of the left retractable strip 218 and the right retractable strip 228 at a location that is vertically aligned about two inches inward of the outer edges (i.e., the width) of the ramp 20.

It is also desirable to provide the sixth modified ramp safety guide 200 (or any other version or embodiment of the instant invention) with as low a profile as possible to further lessen the likelihood of the cargo item 244 making contact with it.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A ramp safety guide for use with a ramp that includes a first end of the ramp that is disposed at a first elevation and wherein the first elevation is proximate to a floor of a vehicle and wherein the ramp includes an opposite second end that is disposed at a second elevation, comprising:
   (a) indicative means that is elevated above the floor, said indicative means providing an indication of a location of the first end of the ramp; and
   (b) wherein said indicative means includes at least a portion thereof that is disposed proximate to the first end of the ramp.

2. The ramp safety guide of claim 1 wherein said indicative means includes a visual indication of a location that is proximate to the first end of the ramp.

3. The ramp safety guide of claim 1 wherein said indicative means includes a tactile indication of a location that is proximate to the first end of the ramp.

4. The ramp safety guide of claim 1 wherein said indicative means includes an indication of a location that is proximate to a center longitudinal axis of the ramp.

5. The ramp safety guide of claim 4 wherein said indication of a location that is proximate to a center longitudinal axis of the ramp includes a flexible strip that is suspended from a location above the floor and which descends a predetermined distance toward the floor and does not make contact with the floor.

6. The ramp safety guide of claim 5 wherein said location above the floor includes a ceiling of a truck.

7. The ramp safety guide of claim 5 wherein said location above the floor includes an overhead door of a truck.

8. The ramp safety guide of claim 5 wherein said flexible strip includes a retractable strip, and wherein said retractable strip is adapted to retract at least partially into a housing for storage and to extend a predetermined amount from said housing for use.

9. The ramp safety guide of claim 8 wherein said predetermined amount that said retractable strip can extend from said housing includes a variable amount.

10. The ramp safety guide of claim 8 wherein said housing includes a spool.

11. The ramp safety guide of claim 5 wherein said flexible strip includes a width that is less than the width of the ramp.

12. The ramp safety guide of claim 5 wherein said flexible strip includes a width that is equal to the width of the ramp.

13. The ramp safety guide of claim 5 wherein said flexible strip includes a center retractable strip that is adapted to retract into a center frame member or extend therefrom a predetermined amount, and including a left retractable strip that is adapted to retract into a left frame member or extend therefrom a predetermined amount, and including a right retractable strip that is adapted to retract into a right frame member or extend therefrom a predetermined amount.

14. The ramp safety guide of claim 13 wherein said center retractable strip, said left retractable strip, and said right retractable strip are mechanically coupled together, and wherein if either said center retractable strip, said left retractable strip, or said right retractable strip is extended or retracted with respect to said ramp safety guide, said remaining portion thereof is similarly extended or retracted.

15. The ramp safety guide of claim 14 wherein any of said center retractable strip, said left retractable strip, or said right retractable strip includes a preferred background color and a plurality of spaced-apart diagonal lines on a surface thereof.

16. The ramp safety guide of claim 14 including a center reel that is adapted to receive the center retractable strip.

17. The ramp safety guide of claim 14 including a left reel that is adapted to receive the left retractable strip.

18. The ramp safety guide of claim 14 including a right reel that is adapted to receive the right retractable strip.

19. The ramp safety guide of claim 13 including a mounting surface that extends longitudinally along a first side of said ramp safety guide, said mounting surface adapted for attachment of said ramp safety guide to a surface, and including a curved opposite side that extends longitudinally along a second side of said ramp safety guide, said second side distally disposed with respect to said first side.

20. The ramp safety guide of claim 1 wherein said indicative means includes an indication of a location that is proximate to a first longitudinal edge of the ramp.

21. The ramp safety guide of claim 20 wherein said indicative means includes an indication of a location that is proximate to a second longitudinal edge of the ramp that is disposed on an opposite side of the ramp with respect to the first longitudinal edge.

22. The ramp safety guide of claim 20 wherein said indication of a location that is proximate to a first longitudinal edge of the ramp includes a flexible strip that is suspended from a location above the floor and which descends a predetermined distance toward the floor and does not make contact with the floor.

23. The ramp safety guide of claim 22 wherein said location above the floor includes a ceiling of a truck.

24. The ramp safety guide of claim 22 wherein said location above the floor includes an overhead door of a truck.

25. The ramp safety guide of claim 22 wherein said flexible strip includes a retractable strip, and wherein said retractable strip is adapted to retract at least partially into a housing during storage and to extend a predetermined amount from said housing during use.

26. The ramp safety guide of claim 25 wherein said predetermined amount that said retractable strip can extend from said housing includes a variable amount.

27. The ramp safety guide of claim 25 wherein said housing includes a spool.

28. The ramp safety guide of claim 1 including means for detachably-attaching said indicative means with respect to a location that is disposed above the floor and proximate to the first end of the ramp.

29. The ramp safety guide of claim 28 wherein said means for detachably-attaching includes a first half of a hook and loop fastener that is attached to said ramp safety guide and a second half of said hook and loop fastener that is attached to said location that is disposed above the floor.

30. The ramp safety guide of claim 1 including second indicative means that is elevated above the floor, said second indicative means providing an indication of a location of the first end of the ramp, and wherein said second indicative means includes at least a portion thereof that is disposed a greater distance away from the first end of the ramp than is said indicative means.

31. The ramp safety guide of claim 30 wherein when said second indicative means is aligned with said indicative means a line there-between is in alignment with a center longitudinal axis of the ramp.

32. The ramp safety guide of claim 30 wherein when said second indicative means is aligned with said indicative means a line there-between is in alignment with a first longitudinal edge of the ramp.

33. The ramp safety guide of claim 32 wherein when said second indicative means is aligned with said indicative means a line there-between is in alignment with a second longitudinal edge of the ramp, and wherein said second longitudinal edge is disposed on an opposite side of the ramp as is said first longitudinal edge.

34. The ramp safety guide of claim 1 wherein said indicative means includes a first visual indication that is disposed proximate a center longitudinal axis of the ramp and wherein said first visual indication includes a first color.

35. The ramp safety guide of claim 1 wherein said indicative means includes a first visual indication that is disposed proximate a first edge of the ramp and wherein said first visual indication includes a second color.

36. The ramp safety guide of claim 35 wherein said indicative means includes a second visual indication that is disposed proximate a second edge of the ramp and wherein said second edge is disposed on an opposite side of the ramp as said first edge, and wherein said second visual indication includes a third color and wherein said third color is different than said second color.

37. The ramp safety guide of claim 1 including means for attaching a first end of the ramp safety guide to an overhead door of a truck and including means for detachably-attaching a second end of the ramp safety guide to the overhead door.

38. The ramp safety guide of claim 37 wherein said first end is attached a predetermined distance away from a bottom edge of the overhead door.

39. The ramp safety guide of claim 1 including means for detachably-attaching a first end of the ramp safety guide to a side-swinging door of a truck and including means for detachably-attaching a second end of the ramp safety guide to the side-swinging door and including means for detachably-attaching said first end to a roof of said truck.

40. The ramp safety guide of claim 39 wherein said first end is attached to said roof of said truck a predetermined distance away from a rear edge of a floor of said truck.

* * * * *